(12) United States Patent (10) Patent No.: US 7,655,145 B1
Gormly et al. (45) Date of Patent: Feb. 2, 2010

(54) CONTAMINATED WATER TREATMENT

(75) Inventors: Sherwin J. Gormly, Carson City, NV (US); Michael T. Flynn, Corte Madera, CA (US)

(73) Assignee: United States Government as represented by the Administrator of the National Aeronautics and Space Administration (NASA), Washington, DC (US)

( * ) Notice: Subject to any disclaimer, the term of this patent is extended or adjusted under 35 U.S.C. 154(b) by 276 days.

(21) Appl. No.: 11/543,275

(22) Filed: Sep. 28, 2006

(51) Int. Cl.
*C02F 1/44* (2006.01)
*B01D 15/00* (2006.01)
*B01D 61/00* (2006.01)

(52) U.S. Cl. .................. 210/649; 210/652; 210/694; 210/724

(58) Field of Classification Search .................. None
See application file for complete search history.

(56) References Cited

U.S. PATENT DOCUMENTS

| | | | |
|---|---|---|---|
| 5,281,430 A | 1/1994 | Herron et al. | |
| 6,436,282 B1 * | 8/2002 | Gundrum et al. | 210/117 |
| 6,656,361 B1 | 12/2003 | Herron et al. | |
| 6,849,184 B1 | 2/2005 | Lampi et al. | |
| 2004/0004037 A1 * | 1/2004 | Herron | 210/321.83 |
| 2005/0155939 A1 * | 7/2005 | Stadelmann | 210/764 |
| 2007/0181497 A1 * | 8/2007 | Liberman | 210/636 |

OTHER PUBLICATIONS

Beaudry, et al., Direct Osmotic Concentration of Waste Water, Final report, Osmotek, Inc. NASA contract No. NAS2-14069, 1999.

Cath, et al., New Concepts and Performance of the Direct Osmotic . . . , Proceedings of 36th International Conference on Environmental Systems, Jul. 17-20, 2006, Norfolk, VA, USA.

Exploration Systems Architechture Study (ESAS), NASA-TM-2005-214062, Nov. 2005, 234.

Gormly, et al., Direct Osmotic Concentration: A Primary Water . . . , Proceedings of the 33rd International Conference on Environmental Systems, Jul. 2003, Vancouver BC, Canada.

Horan, et al., Application of Granular Activated Carbon-Biological Fluidized Bed for the Treatment of Landfill Leachat . . . , Wat. Sci. Tech., 1997, 369-375, 36-No. 2-3, IWAQ.

Kliss, Water Regeneration Technologies for Human Space . . . , Proceedings of Conference on Innovative Technologies in the Water Sector, May 15-17, 2006, Rotterdam, Netherlands.

* cited by examiner

*Primary Examiner*—Krishnan S Menon
(74) *Attorney, Agent, or Firm*—John F. Schipper; Robert M. Padilla

(57) ABSTRACT

Method and system for processing of a liquid ("contaminant liquid") containing water and containing urine and/or other contaminants in a two step process. Urine, or a contaminated liquid similar to and/or containing urine and thus having a relatively high salt and urea content is passed through an activated carbon filter to provide a resulting liquid, to remove most of the organic molecules. The resulting liquid is passed through a semipermeable membrane from a membrane first side to a membrane second side, where a fortified drink having a lower water concentration (higher osmotic potential) than the resulting liquid is positioned. Osmotic pressure differential causes the water, but not most of the remaining inorganic (salts) contaminant(s) to pass through the membrane to the fortified drink. Optionally, the resulting liquid is allowed to precipitate additional organic molecules before passage through the membrane.

8 Claims, 4 Drawing Sheets

CONTAMINATED WATER TREATMENT

FIELD OF THE INVENTION

This invention relates to processing and recycling of liquid, including urine, to remove contaminants in the liquid.

BACKGROUND OF THE INVENTION

The Crew Exploration Vehicle ("CEV") and the Lunar Surface Access Module ("LSAM"), to be used for space exploration, will require new life support systems to support the crew on journeys lasting from a few days to several weeks, or longer. These life support systems should also be designed to reduce the mass required to keep humans alive in space. Water accounts for about 80 percent of the daily mass intake required to keep a person alive. As a result, recycling water offers a high return on investment for space life support. Water recycling can also increase mission safety by providing an emergency supply of drinking water, where another supply is exhausted or contaminated. For a three-day CEV mission to the International Space Station (ISS), water recycling can reduce the mass required to be transported to provide drinking water by 65 percent, when compared to stored water. For an 18-day Lunar mission, a mass savings of about 70 percent is possible. These technologies also increase safety by providing a lightweight back-up to stored supplies, and they allow astronauts to meet daily drinking water requirements by recycling the water contained in their own urine. During a three-day CEV emergency return to Earth, this capability could be critical to the crews' survival. These technologies also convert urine into a concentrated brine that is biologically stable and non-threatening and can be safely stored onboard. This approach eliminates the need to have a dedicated vent to dump urine overboard. This would result in one less through hull fitting on the CEV spacecraft (a significant safety advantage).

What is needed is a system for recycling urine (1) to provide a renewable source of drinking water, (2) to reduce the mass of water initially stored aboard a spacecraft, (3) to provide a temporary source of additional nutrients for use by a spacecraft occupant, (4) to reduce the volume of, and provide a biologically safe form of, urine residuals (i.e. waste or non-water residues from urine) temporarily stored aboard a spacecraft and (5) reduce or eliminate the need for urine dumping during a space voyage.

SUMMARY OF THE INVENTION

These needs are met by a system and associated method that provides a contaminant treatment pouch, referred to as a "urine cell" or "contaminant cell," that converts urine or another liquid containing contaminants into a fortified drink, engineered to meet human hydration, electrolyte and caloric requirements, using a variant of forward osmosis ("FO") to draw water from a urine container into the concentrated fortified drink as part of a recycling stage. An activated carbon pre-treatment removes most organic molecules. Salinity of the initial liquid mix (urine plus other) is synergistically used to enhance the precipitation organic molecules so that activated carbon can remove most of the organics. A functional osmotic bag is then used to remove inorganic contaminants. If a contaminant is processed for which the saline content is different than optimal for precipitating organic molecules, the saline content of the liquid should be adjusted toward the optimal value for that contaminant.

The development of a water recycling systems to support CEV and LSAM missions can significantly reduce the mass of life support mechanisms. Current plans for the CEV assume that water is "tanked" and that urine is vented overboard. This open loop approach does not attempt to minimize launch mass, and it requires provisions of at least one additional through-wall penetrations. The CEV is, by definition a pressure vessel upon which the crew's life depends and thus any through wall fitting represents a potentially fatal (to the crew) failure point in vehicle design. The CEV, Block 1 mission, which is to transfer crew and limited cargo to ISS, and Block 2, a Lunar mission, are both relatively short flight duration vehicles, at most a few weeks. Short duration missions can be addressed by the use of consumable water treatment products. These products offer reduced mass and produce recycled water for only a fraction of the weight of the water itself. For example, a disposable water purification system, such as the urine cell, could produce 1 Kg of drinking water from urine with only 300 gm of water purification equipment, a 70 percent reduction in mass below what is required with stored water.

DESCRIPTION OF BEST MODE OF THE INVENTION

Figure 1:
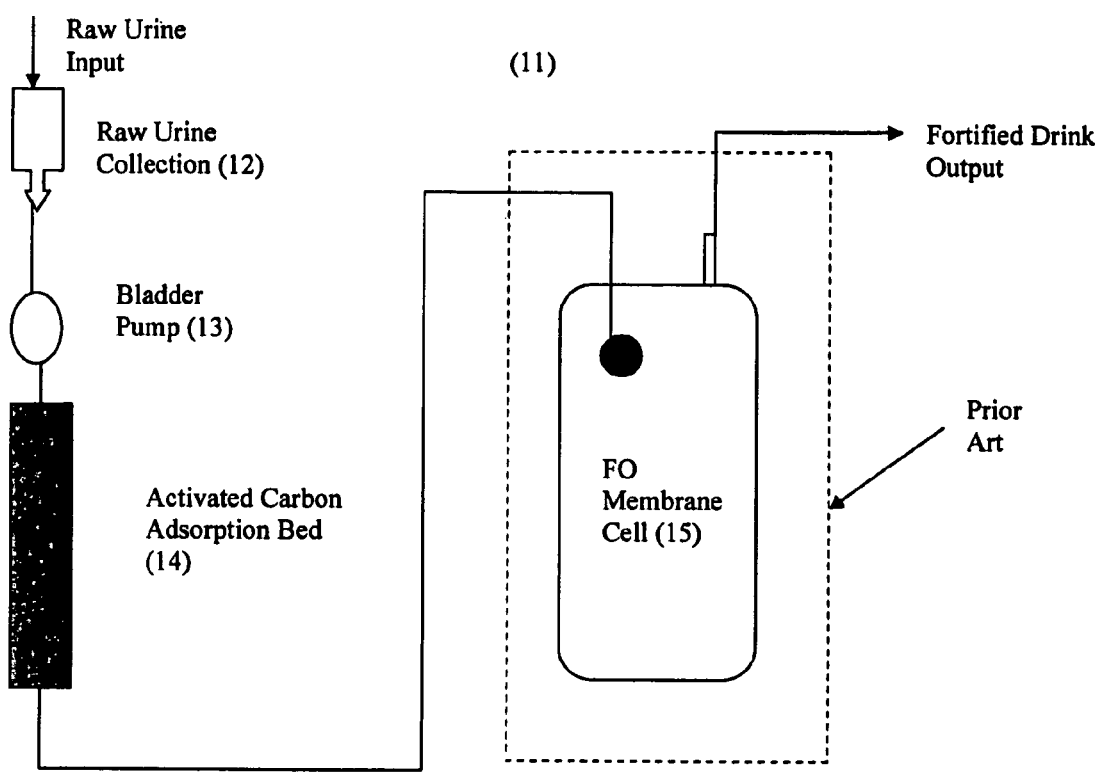
FIG. 1 schematically illustrates the location of the basic X-Pack configuration (prior Art).

An FO based urine cell 11 utilizing both activated carbon (AC) and the X-Pack™ technology, disclosed by Hydeation Technologies, Inc., is illustrated in FIG. 1. See, for example U.S. Pat. No. 6,849,184, issued to Lampi et al for previous disclosure of FO membrane cell 15. In the invention a bladder pump 13 is fed by a urine collector 12 and moves the liquid through an activated carbon (AC) filter 14 into a membrane container in a pouch 15. The membrane promotes separation of water from urine, and the product, having a lowered urea content, is drawn off as product.

Figure 2:
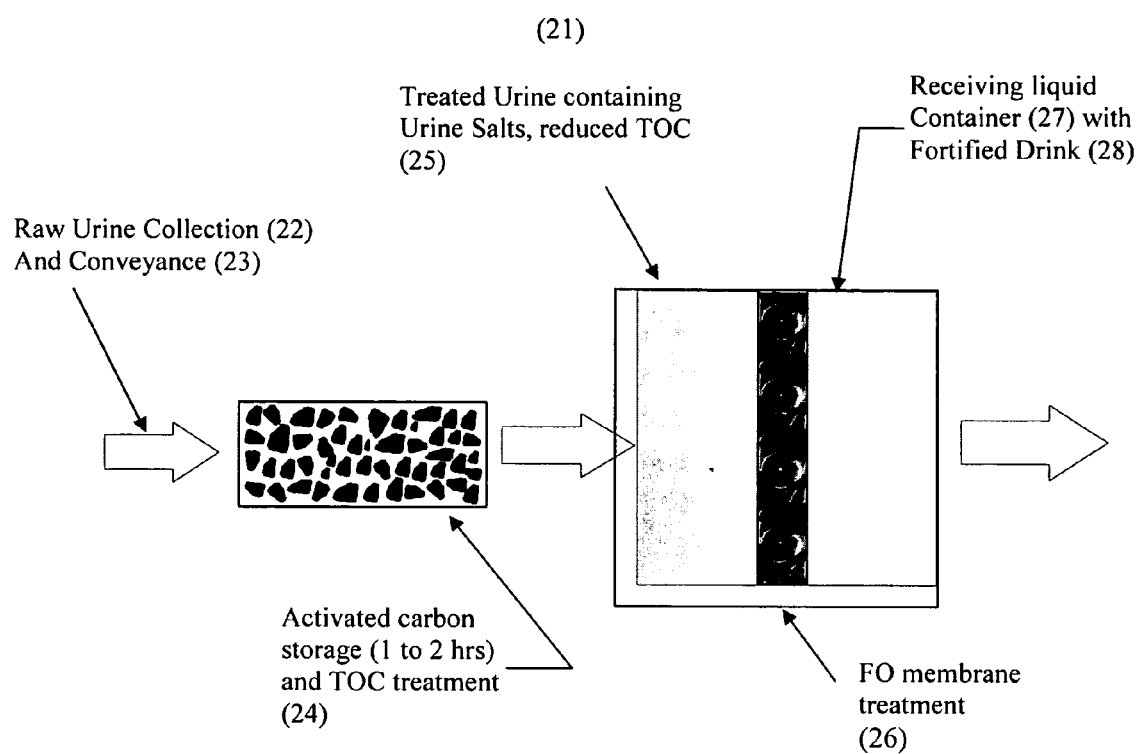
FIG. 2 illustrates an embodiment of the invention.

The invention 21, illustrated in FIG. 2, is an improvement of technologies similar to the X-Pack™ device. The liquid to be treated is passed through an activated carbon filter 24 (granules or porous block or another suitable filter mechanism), which absorbs a majority of the remaining organic molecules to provide a resulting liquid. The resulting liquid is received by a container 25 that is positioned adjacent to a first side of a semipermeable, preferably hydrophilic, membrane 26 (e.g., cellulous triacetate) that allows water diffuse through it, but blocks most contaminants (urea, brine, etc.) due to a micro-porous construction of the filter. A container 27 of a concentrated fortified drink 28 is positioned adjacent to a second side of the membrane 26. Some precipitation of the remaining organic molecules occurs within the container 25.

Water is drawn through the membrane 26, from the first side to the second side, by an osmotic potential differential $\Delta OP$, generated by the feed (urine or another contaminated liquid) and by sugars and electrolytes contained in the fortified drink 28 that is concentrated (strength range 2-20 times normal strength, or more if desired). Water diffuses across the membrane 26 from the urine (water-rich) first side to the concentrated fortified drink (water-poor) second side in order to (partly) equalize the osmotic potential. During this diffusion process, the concentrated fortified drink 28 will become diluted through uptake of water, and the urine will become more concentrated by loss of water. The fortified drink concentrate has the sugars, electrolytes and calories needed by a human and is formulated so that the final product is diluted to a level appropriate for human consumption. Because the process uses osmotic potential OP rather than hydraulic pressure, the process is referred to as forward osmosis ("FO"), which can be thought of as running reverse osmosis ("RO") in reverse. Because the process uses osmotic potential instead of hydraulic pressure, it has been shown to have fewer membrane fouling problems that are inherent to RO and microfiltration.

Table 1 presents data on the treatment of organic compounds using the membranes and AC filter selected for use in the urine cell (more generally, contaminant cell). Table 2 provides the results of bacteriological and viral rejection tests of the X-Pack™ membranes.

TABLE 1

Projected Performance of the Urine Cell

| Stage of Treatment | Typical Values (in mg/L TOC) |
| --- | --- |
| Raw Urine | 2,500 to 5,500 mg/L |
| After GAC Treatment | 50 to 100 mg/L |
| After CTA (stock) Forward Osmosis Membrane | 20 to 30 mg/L |
| Theoretical System Performance Limit with Optimal Membranes | 1 to 2 mg/L |

TABLE 2

Bacterial and Viral Testing

| Test Description | 1 hr sample | 24 hr sample |
| --- | --- | --- |
| Anthrax Permeation | | |
| 1.200,000/ml | — | 0 |
| Pigment Ink Dilution | | |
| 0.4-1.0 micron | 0 | 0 |
| *E. Coli* Permeation | | |
| colony counts 1,000,000/ml | 0 | 0 |
| colony counts 100,000,000/ml | 0 | 0 |
| M 13 phage Permeation | | |
| phage counts 10,000,000/ml | 0 | 0 |
| phage counts 1,000,000,000/ml | 0 | 0 |
| MS2 phage Permeation | | |
| phage counts 1,000,000/ml | 0 | 0 |
| phage counts 100,000,000/ml | 0 | 0 |
| M13 phageDNA Permeation | | |
| 2 mg in 4 liters | 0 | 0 |

Although a technology, such as the basic X-Pack™ device, is capable of removing most inorganic compounds, this device will not reliably remove small non-polar organics or ammonia; up to 50 percent of these compounds will pass through the membrane. Urine contains many of these types of contaminates. Activated carbon, as granules or in a porous block, is used to pre-treat the urine and to remove many, but not all, organic molecules, including most non-polar organics. Activated carbon also has a weak affinity for ammonia. The relatively high concentration of salts in urine in FIG. 2 works synergistically to improve the performance of the activated carbon. Commercially available AC is used.

Preferably, the system 21 provides for the collection 22 (12 in FIG. 1) and movement 23 (13 in FIG. 1) of the urine, preceding to an activated carbon ("AC") porous filter 24. The relatively high salinity of the urine enhances the performance of the AC filter 24 by decreasing the solubility of organic molecules in the input liquid, significantly increasing the affinity of these molecules for AC, resulting in a product with approximately 50 mg/liter total organic carbon (TOC) remaining, as compared to about 200 mg/liter TOC (as urea), after AC treatment of fresh water, with no urine salts present. Preferably, the urine temperature and the fortified drink temperature are in a range between room temperature and about 20 to 30° C.; and/or the pH of the fortified drink is adjusted to be no higher than about 8.

Figure 3A:
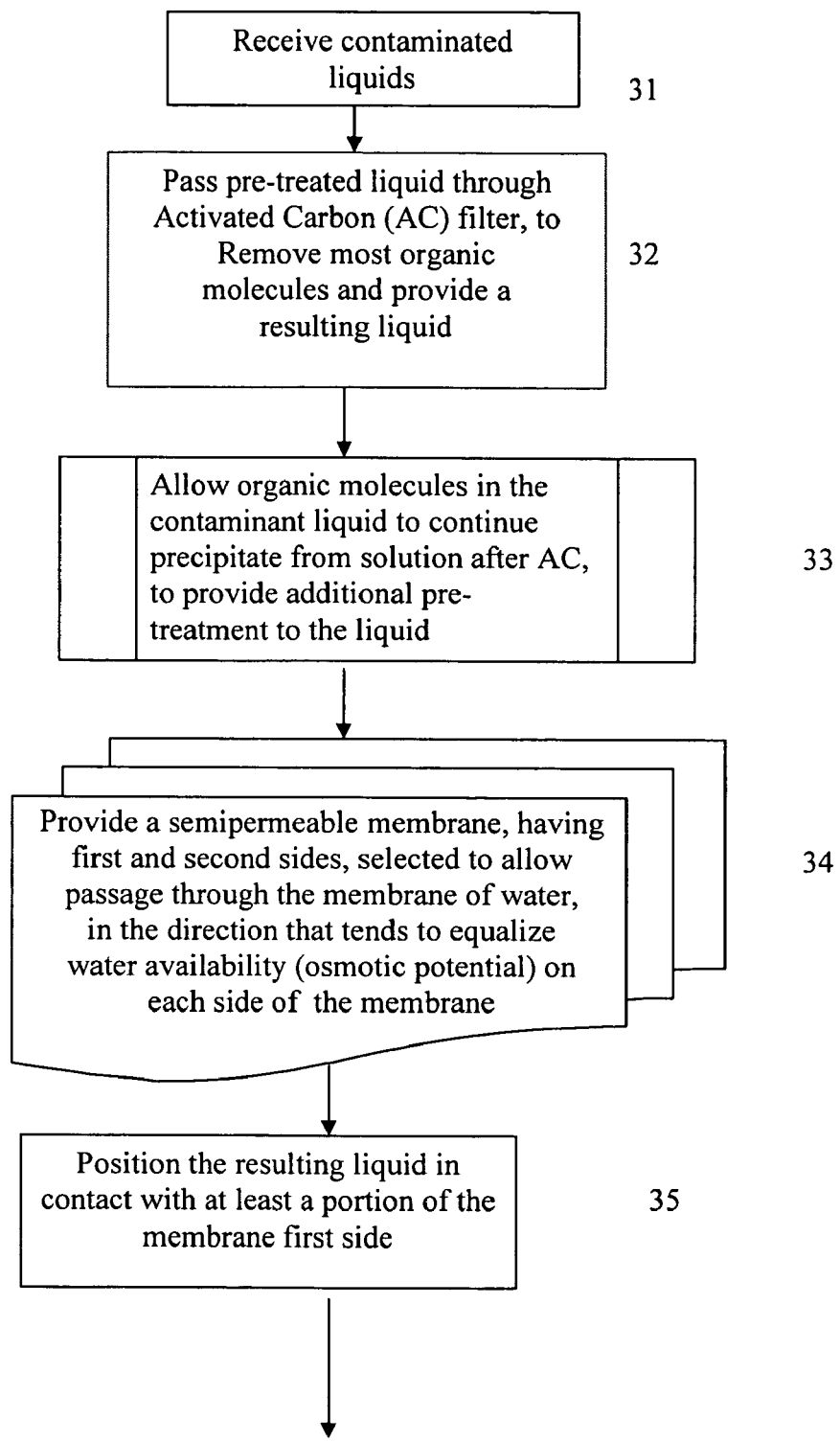
FIGS. 3A and 3B show a flow chart of a procedure for practicing the invention.
Figure 3B:
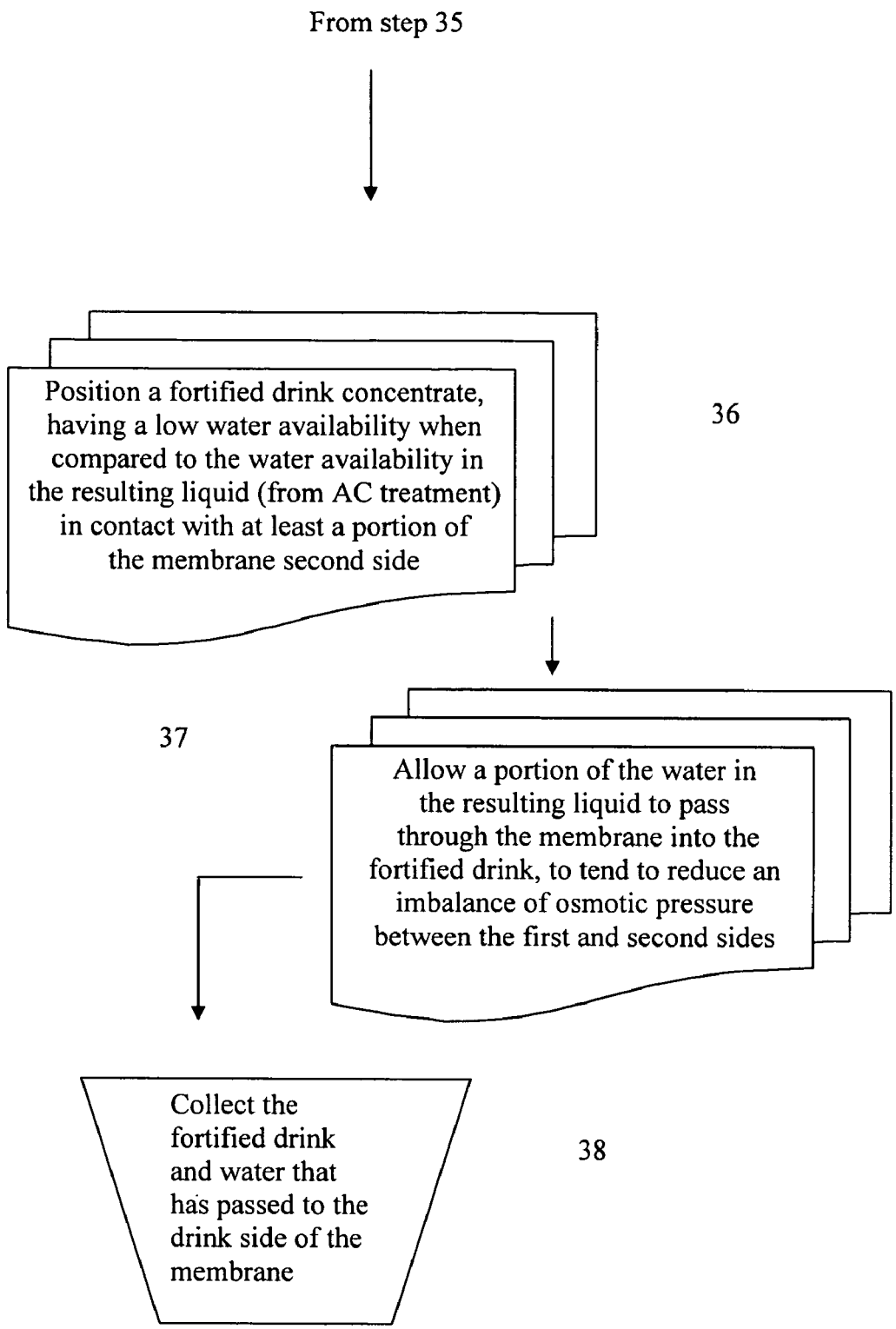

FIG. 3 is a flow chart of a procedure for practicing the invention. In step 31, a liquid containing at least one contaminant ("contaminant liquid"), usually urine or a substantially similarly contaminated liquid, is received. In step 32, the contaminant liquid is passed through an activated carbon filter to produce a resulting liquid in which a majority of organic molecules have been removed. In step 33 (optional), a remainder of organic molecules in the resulting liquid are allowed to precipitate from solution, before passage through a membrane (step 34). In step 34, a semipermeable membrane is provided, having a first side and a second side, and being selected to allow passage therethrough of water in a direction that tends to equalize concentration of water on the first and second sides of the membrane. In step 35, the resulting liquid is positioned in contact with at least a portion of the membrane first side.

In step 36, a concentrated fortified drink, having a low concentration of water compared to a concentration of water in the resulting (from AC treatment) liquid, is positioned in contact with at least a portion of the membrane second side. In step 37, a portion of the resulting liquid is allowed to pass through the membrane, from the first side to the second side into the fortified drink, to reduce an imbalance of concentration of water on the first and second sides of the membrane. In step 38, the fortified drink and the water that has passed through the membrane are collected.

Tests performed on the urine cell indicate that: (1) raw urine has a total organic content ("TOC") of 2,500-5,000 mg/liter, before treatment; (2) after treatment, TOC lies in a range of 25-50 mg/liter; and (3) an optimal treatment according to the invention can theoretically lower TOC to 1-2 mg/liter. Urea is the source of the majority of TOC present in urine, and testing indicates that as much as 95-97 percent of urea can be removed using the invention.

The membranes used in the urine cell should be an effective barrier to inorganic compounds. Cellulose tri-acetate (CTA) membranes, similar to those used in the urine cell, are widely used in reverse osmosis (RO) applications and inorganic rejection data are available from suppliers and from published technical articles. Ammonia is present in low or modest percentages in fresh urine. The normal range of urine ammonia for healthy adults is 200-500 ppm. This is a product of urea hydrolysis, a relatively slow process, and treatment within 1 hour of urine generation should help to keep concentrations of ammonia low in the feed and in the product. Most ammonia and nitrogen that is present will be removed from the feed by an AC filter.

In future urine cell designs it may be desirable to enhance the ammonia removal beyond the capabilities of the current (above claimed) design. This would be accomplished through the addition of a $3^{rd}$ treatment step located between the AC and the FO membrane steps of the urine cell, and would simply require a chemical addition during step 33 (FIG. 3:

Step 33). Ammonia that is not removed by the AC filter can be further reduced by pH adjustment and/or by supplemental absorption using diatomaceous Earth or an amine chemical addition following AC treatment but prior to FO treatment. Low pH (highly acidic) values ensure that ammonia in solution exists predominantly as the ammonium ion. Ammonium ions can be removed by micro-porous membranes. Ammonia can also be removed by diatomaceous Earth or amines. In ether case the additional pH adjustment and/or chemical addition would be provided between to AC and FO treatments (at step 33) and is claimed as a process improvement option to be freely exercised (without farther patenting applications to the primary invention) should it become desirable or necessary.

The urine cell may be usable more than once, until the osmotic strength of salt in the bag approach the osmotic strength of the sugar in the fortified drink. The urine cell is relatively small and can be incorporated into a flight suit or a space suit and thus become an integral part of a spaceworker's apparel. If the urine cell is made part of a pressure suit the cell may be useful during a specified 120-hour un-pressurized emergency return to Earth capability in a CEV. During an emergency, the urine cell can provide emergency urine collection and drinking water supplies, as a redundant backup. The urine cell uses no electrical power, has no complicated mechanical parts to break or to require maintenance, is silent, and has a shelf life in excess of one year. The cell includes a flexible plastic pouch, surgical tubing, an AC filter, and a water collection device.

The membrane may be hydrophilic, where the membrane pore diameters are as large as, or slightly larger than the minimum diameter required allow liquid phase water to flow, but are smaller than required to pass most organic molecules. Some relatively small organic, non-polar compounds will pass through these pores. The preferred design utilizes hydrophilic membranes, but hydrophobic membranes, in which pore diameters are much smaller, can also be used when desirable. Hydrophilic membranes are preferable for the current design because they achieve reasonable flux or throughput (water production rates), but future application may chose to reduce flux rate for better rejection of urea, in which case hydrophobic membranes would be used without further modification to the concept design. Water transfer rates are about 14 liters/hour/(meter)$^2$ and 0.04 liters/hour/(meter)$^2$ for the hydrophilic and hydrophobic membranes, respectively. The membrane surface area can be increased by using a pleated membrane sheet or by using a plurality of helices to increase the effective surface area of the membrane.

What is claimed is:

1. A method for treatment of a liquid containing urea, the method comprising:
   receiving a liquid containing urea (urea containing liquid or "UCL"), having a salt content of at least 5 gm/liter and having a total organic content ("TOC") of at least 2500 mg/liter;
   passing the UCL through an activated carbon filter to produce an intermediate liquid, in which at least 90 percent of organic molecules have been removed, within about one hour after the UCL was generated;
   providing a semipermeable membrane, having a first side and a second side, and being selected to allow passage therethrough of water in the intermediate liquid in a direction that tends to equalize osmotic potential of water on the first and second sides of the membrane;
   positioning the intermediate liquid in contact with at least a portion of the membrane first side;
   positioning a concentrated fortified drink, having a higher liquid osmotic potential for water than a UCL osmotic potential for water on the membrane first side, in contact with at least a portion of the membrane second side; and
   allowing a portion of the intermediate liquid to pass through the membrane from the first side to the second side to tend to reduce an imbalance of osmotic potential of the liquids on the first and second sides of the membrane, and to produce a processed liquid having a TOC of no more than 25-50 mg/liter.

2. The method of claim 1, further comprising collecting at least a portion of a mixture of said fortified drink and said water that has passed through said membrane, on said membrane second side.

3. The method of claim 1, further comprising maintaining or increasing salinity of said UCL before passing said UCL through said activated carbon filter, to promote additional removal of organic molecules by said activated carbon filter.

4. The method of claim 1, further comprising providing a hydrophilic membrane as said semipermeable membrane.

5. The method of claim 1, further comprising providing a hydrophobic membrane as said semipermeable membrane.

6. The method of claim 1, further comprising adjusting pH of said UCL after passing said UCL through said activated carbon filter, to promote separation of a selected contaminant from said by said membrane.

7. The method of claim 1, further comprising removing at least 95 percent of urea from said UCL.

8. The method of claim 5, further comprising removing at least 99 percent of said urea from said UCL.

\* \* \* \* \*

UNITED STATES PATENT AND TRADEMARK OFFICE
CERTIFICATE OF CORRECTION

| | | |
|---|---|---|
| PATENT NO. | : 7,655,145 B1 | Page 1 of 1 |
| APPLICATION NO. | : 11/543275 | |
| DATED | : February 2, 2010 | |
| INVENTOR(S) | : Gormly et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 403 days.

Signed and Sealed this

Twenty-third Day of November, 2010

David J. Kappos
*Director of the United States Patent and Trademark Office*